(12) United States Patent
Crain et al.

(10) Patent No.: US 10,139,580 B2
(45) Date of Patent: Nov. 27, 2018

(54) RETRACTABLE DATACOMMUNICATIONS RACK

(71) Applicant: CommScope, Inc. of North Carolina, Hickory, NC (US)

(72) Inventors: Charles T. Crain, Melissa, TX (US); Richard L. Case, Omaha, NE (US); Joseph C. Livingston, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/931,419

(22) Filed: Nov. 3, 2015

(65) Prior Publication Data

US 2016/0150670 A1 May 26, 2016

Related U.S. Application Data

(60) Provisional application No. 62/083,460, filed on Nov. 24, 2014.

(51) Int. Cl.
| | |
|---|---|
| *G02B 6/00* | (2006.01) |
| *G02B 6/44* | (2006.01) |
| *F16M 11/10* | (2006.01) |
| *F16M 13/02* | (2006.01) |
| *F16M 11/04* | (2006.01) |
| *F16M 11/24* | (2006.01) |
| *H04Q 1/08* | (2006.01) |

(52) U.S. Cl.
CPC ......... *G02B 6/4452* (2013.01); *F16M 11/046* (2013.01); *F16M 11/048* (2013.01); *F16M 11/10* (2013.01); *F16M 11/242* (2013.01); *F16M 13/02* (2013.01); *F16M 13/027* (2013.01); *H04Q 1/08* (2013.01); *F16M 2200/063* (2013.01); *G02B 6/4455* (2013.01)

(58) Field of Classification Search
CPC ........ H05K 7/186; F16M 11/10; F16M 11/38; F16M 13/02; F16M 13/027; G02B 6/4452
USPC .................................................. 385/134–136
See application file for complete search history.

(56) References Cited

U.S. PATENT DOCUMENTS 5,568,773 A * 10/1996 Hung ..................... A47B 21/00
108/50.01
5,630,566 A * 5/1997 Case .................... A47B 23/046
248/122.1
(Continued)

FOREIGN PATENT DOCUMENTS

EP 1 591 815 A1 2/2005

OTHER PUBLICATIONS

International Search Report and Written Opinion for corresponding PCT Application No. PCT/US2015/061220, dated Mar. 2, 2016, 12 pages.
(Continued)

*Primary Examiner* — Ryan Lepisto
*Assistant Examiner* — Guy Anderson
(74) *Attorney, Agent, or Firm* — Merchant & Gould P.C.

(57) ABSTRACT

A retractable datacommunications rack includes: a mounting member configured to mount to a mounting structure; a linkage mounted to the mounting member; and an enclosure mounted on the linkage and configured to provide locations for datacommunications interconnections. The linkage is configured to move the enclosure between a retracted raised position and a lowered working position.

18 Claims, 5 Drawing Sheets

(56) References Cited

U.S. PATENT DOCUMENTS

| | | | | |
|---|---|---|---|---|
| 5,667,179 A * | 9/1997 | Rosen | B60N 2/468 | 248/278.1 |
| 5,709,360 A * | 1/1998 | Rosen | B60N 2/468 | 248/278.1 |
| 6,134,103 A * | 10/2000 | Ghanma | F16M 11/24 | 248/917 |
| 6,409,127 B1 | 6/2002 | Vanderheide et al. | | |
| 6,418,266 B1 | 7/2002 | Vitantonio | | |
| 7,677,518 B2 * | 3/2010 | Chouinard | A47B 21/02 | 108/10 |
| 8,653,959 B2 * | 2/2014 | Lynam | B60K 35/00 | 340/425.5 |
| 9,062,817 B1 * | 6/2015 | Housman | F16M 13/027 | |
| 9,220,348 B2 * | 12/2015 | Stieler | A47C 7/68 | |
| 9,507,114 B2 * | 11/2016 | Timmins | G02B 6/3897 | |
| 2001/0023914 A1 * | 9/2001 | Oddsen, Jr. | F16M 11/10 | 248/274.1 |
| 2004/0178312 A1 * | 9/2004 | Parsons | A61G 15/10 | 248/276.1 |
| 2004/0216911 A1 | 11/2004 | Franz et al. | | |
| 2005/0051688 A1 * | 3/2005 | Dittmer | F16M 11/10 | 248/276.1 |
| 2007/0278361 A1 * | 12/2007 | May | A47B 21/0314 | 248/126 |
| 2009/0133609 A1 * | 5/2009 | Nethken | A47B 21/02 | 108/50.02 |
| 2009/0238533 A1 * | 9/2009 | Stansbury | G02B 6/4452 | 385/135 |
| 2010/0148647 A1 * | 6/2010 | Burgess | A47B 21/00 | 312/327 |
| 2010/0213151 A1 * | 8/2010 | Theesfeld | A47B 57/06 | 211/151 |
| 2012/0187056 A1 * | 7/2012 | Hazzard | A47B 21/02 | 211/26 |
| 2013/0340668 A1 | 12/2013 | Robertson | | |
| 2013/0341476 A1 * | 12/2013 | Hazzard | A47B 21/02 | 248/231.31 |
| 2014/0110541 A1 * | 4/2014 | Hoe | F16D 1/12 | 248/160 |
| 2014/0126132 A1 * | 5/2014 | Quijano | F16M 11/10 | 361/679.22 |
| 2014/0306075 A1 * | 10/2014 | Stieler | A47C 7/68 | 248/176.3 |

OTHER PUBLICATIONS

Extended European Search Report for Application No. 15863119.2 dated Jun. 20, 2018.

* cited by examiner

RETRACTABLE DATACOMMUNICATIONS RACK

RELATED APPLICATION

The present application claims priority from and the benefit of U.S. Provisional Patent Application No. 62/083,460, filed Nov. 24, 2014, the disclosure of which is hereby incorporated herein in its entirety.

FIELD OF THE INVENTION

The present invention is directed generally to datacommunications systems, and more particularly to cabinets and racks for datacommunications systems.

BACKGROUND OF THE INVENTION

Communications cables, such as shielded and unshielded twisted pair cables, coaxial cables, and fiber optic cables, are used to transmit data, voice, video and/or audio information in the telecommunications industry. Network equipment enclosure rack systems are well-known in this industry for managing and organizing such cables as they are routed to and from various destinations.

Rack systems typically include a distribution frame rack on which one or more patch panels, network equipment, fiber optic enclosures and the like are mounted. Rack systems serve various functions, including their use as slack trays, splice trays, cable organizers and patch panels. These rack systems also serve as interconnect or cross-connect enclosures when they interface with equipment. Additionally, rack systems may serve as a telecommunications closet, allowing the cables to be terminated, spliced, patched and/or stored at various places along their length.

Typical building entry points utilize a standard 19 inch vertical rack with 1, 2, or 4 U enclosures to manage interconnections of incoming cables, which are typically fiber optic cables. This type of installation occupies floor space and restricts work access. As such, alternative configurations may be desirable.

SUMMARY

As a first aspect, embodiments of the invention are directed to a retractable datacommunications rack. The retractable datacommunications rack comprises: a mounting member configured to mount to a mounting structure; a linkage mounted to the mounting member; and an enclosure mounted on the linkage and configured to provide locations for datacommunications interconnections. The linkage is configured to move the enclosure between a retracted raised position and a lowered working position.

As a second aspect, embodiments of the invention are directed to a retractable datacommunications assembly, comprising: a mounting member configured to mount to a mounting structure; a linkage mounted to the mounting member; and an enclosure mounted on the linkage and configured to provide locations for datacommunications interconnections. The linkage is configured to move the enclosure between a retracted raised position and a lowered working position. The assembly further comprises two fiber optic cables interconnected in one of the locations of datacommunications interconnections. The fiber optic cables are routed to the enclosure along bridge members. The bridge members are configured so that the fiber optic cables experience substantially no increase in tension in moving between the raised and lowered positions.

As a third aspect, embodiments of the invention are directed to a retractable datacommunications assembly, comprising: a mounting member configured to mount to a mounting structure; a linkage mounted to the mounting member; and an enclosure mounted on the linkage and configured to provide locations for datacommunications interconnections, wherein the linkage is configured to move the enclosure between a retracted raised position and a lowered working position. The assembly further comprises two fiber optic cables interconnected in one of the locations of datacommunications interconnections. The enclosure further comprises a fiber management section that receives the fiber optic cables.

DETAILED DESCRIPTION OF EMBODIMENTS OF THE INVENTION

Figure 1:
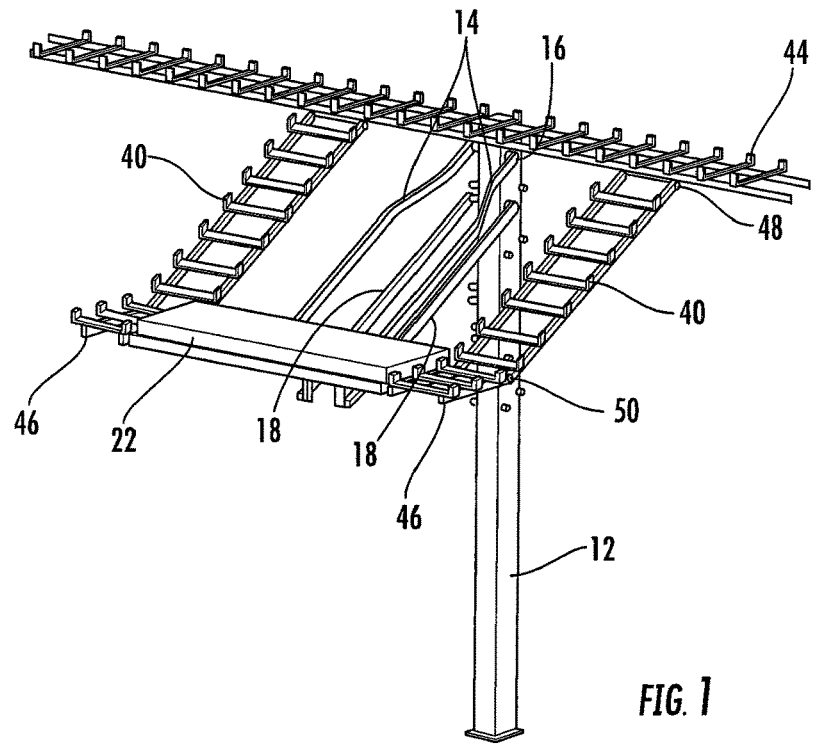
FIG. 1 is a perspective view of a retractable datacommunications rack according to embodiments of the invention.
Figure 2:
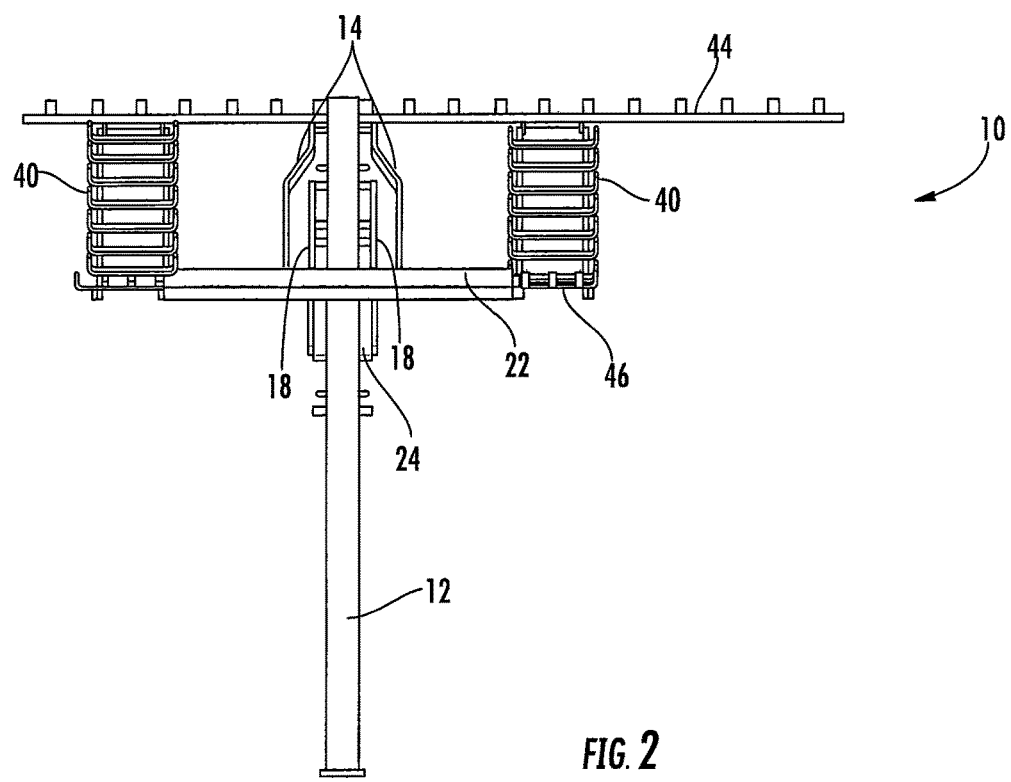
FIG. 2 is a front view of the rack of FIG. 1.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a retractable datacommunications rack, designated broadly at 10, is shown in FIGS. 1-5. The rack 10 departs from the typical vertical entry point rack by creating a horizontal enclosure suspended from the ceiling, wall, column, or other mounting structure.

The rack 10 shown in FIGS. 1-5 is mounted to a structural column 12. Two upper swing links 14 are mounted at one end to the column 12 at pivots 16. Two lower swing links 18 are mounted to the column 12 at pivots 20. In the illustrated embodiment, the upper and lower swing links are 14, 18 are of similar length. A long, shallow enclosure 22 is mounted above and onto a bracket 24. The ends of the upper and lower swing links 14, 18 are mounted to the bracket 24 at pivots 26, 28, respectively. Thus, the column 12, the upper and lower swing links 14, 18 and the bracket 24 form a four-bar linkage that enables the enclosure 22 to rise and descend relative to the column 12. In the illustrated embodiment, the pivots 16 and 20 are vertically aligned, and the pivots 26, 28 are vertically aligned, although in other embodiments these pivots may be horizontally aligned or may be staggered.

The enclosure 22 can vary in dimension based on need, but is typically sized to permit ease of access by one or more technicians at the same time. A hinged or removable lid (not shown) may provide protection to components mounted within the enclosure 22 while allowing full access to the enclosure 22, thereby allowing more rapid termination of high fiber cables.

Figure 6:
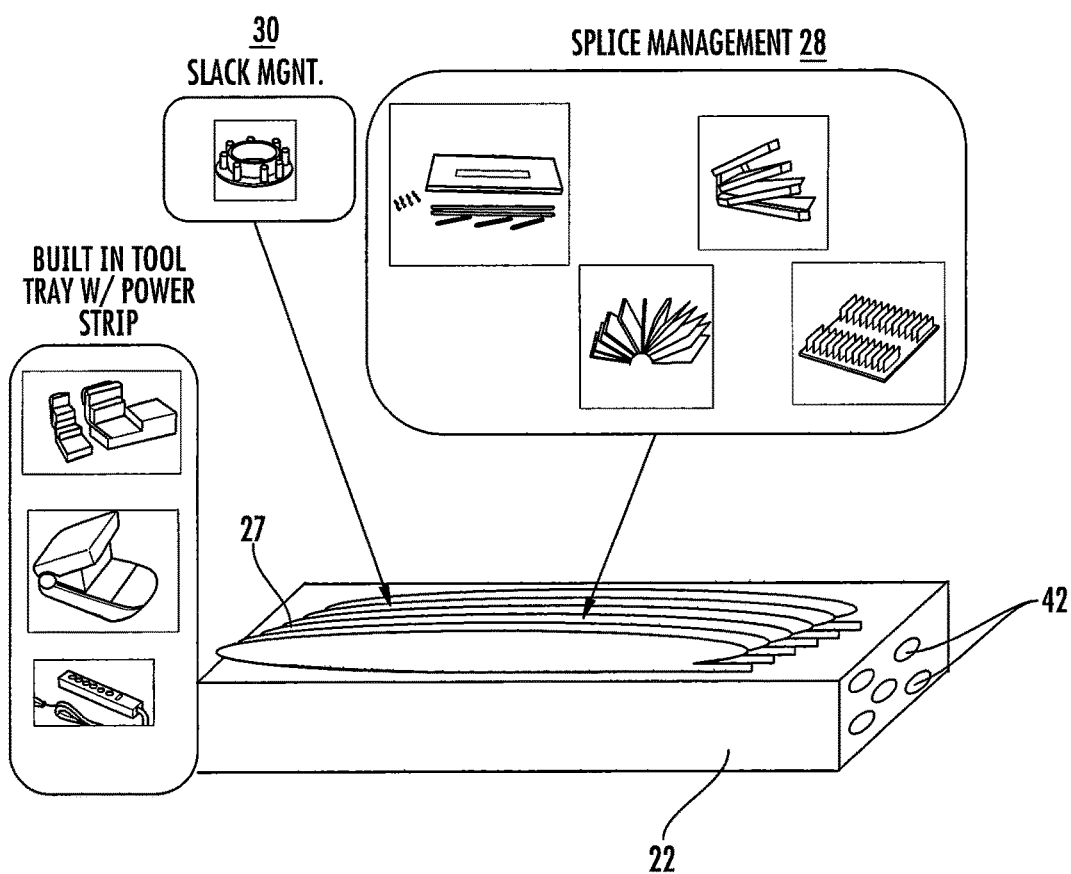
FIG. 6 is a schematic perspective view of the enclosure of the rack of FIG. 1.

Outside plant cables are typically rigid high optical fiber count cables, either in ribbon or loose tube form. Once landed inside a demarcation room, they need to be converted to more flexible enterprise-suited cables. The enclosure 22 may include multiple areas or sections that allow the breakout of smaller, more flexible subunits or provide a means of furcating the bare fiber. As shown in FIG. 6, the enclosure 22 may have one or more of a tool tray 27, a mechanical fusion/splice section 28, one or more fiber management sections 30, bulkhead adapter panels (not shown), and/or a drying desiccant section (also not shown). The long, shallow enclosure 22 can use the natural lay of the cable and gravity to manage large quantities of mechanical or fusion splices.

Referring again to FIGS. 1-5, the rack 10 may also include fiber management bridges 40. The fiber management bridges 40 extend between lateral wings 46 on the enclosure 22 and a channel 44 mounted to or adjacent the upper end of the column 12. The bridges 40 rotate about pivots 48, 50, each of which shares a pivot axis with the pivots 16, 26 of the upper swing links 14. The bridges 40 are configured to provide a route for cables to and from the building to the enclosure 22; cables or cable sub-units are routed from the channel 44 and along the bridges 40 into the enclosure 22 via pass thru holes 42 located at the ends of the enclosure 22 (see FIG. 6). Typically the pass-through holes 42 will include strain relief using compression fittings or sealed cable entry devices.

Figure 3:
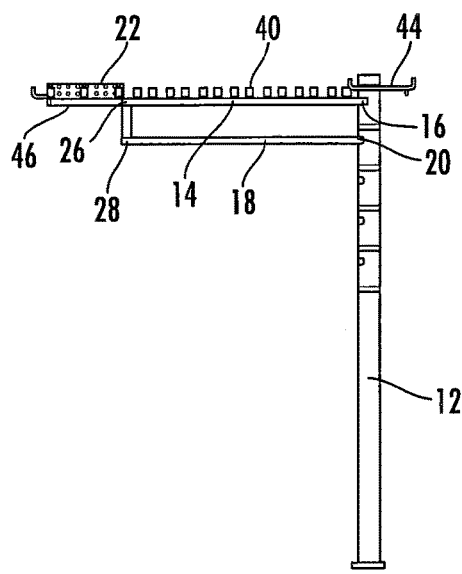
FIG. 3 is a side view of the rack of FIG. 1 shown in the raised position.
Figure 4:
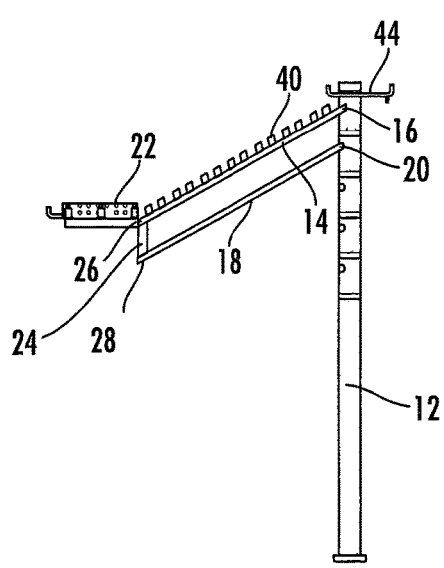
FIG. 4 is a side view of the rack of FIG. 1 shown in an intermediate position.
Figure 5:
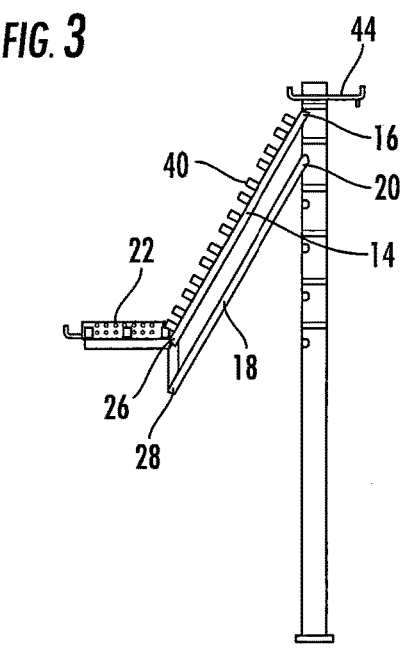
FIG. 5 is a side view of the rack of FIG. 1 shown in the lowered position.

FIGS. 3-5 illustrate the movement of the rack 10 between raised storage and lowered working positions, with FIG. 3 illustrating the raised storage position, FIG. 4 illustrating an intermediate position, and FIG. 5 illustrating the lowered working position. Movement of the rack 10 is controlled by the upper and lower swing links 14, 18 as they rotate (counterclockwise from the vantage point of FIGS. 3-5) about the pivots 16, 20 respectively. In the lowered position, the enclosure 22 can be accessed easily from either side by a technician; however, in the raised position, the enclosure 22 is positioned sufficiently high that the floor space underneath can be used for other purposes.

Notably, because the upper and lower swing links 14, 18 are of similar length and parallel to each other, the enclosure 22 remains in the substantially the same horizontal orientation throughout its movement. In addition, as the enclosure 22 moves, the bridges 40 pivot relative to the channel 44 about the pivots 48. Because the bridges 40 in which the cables/fibers are routed move in concert with and parallel to the upper swing links 14, there is little to no tensile load experienced by the fibers, which can protect the fibers and prevent them from experiencing damaging bending.

Figure 7:
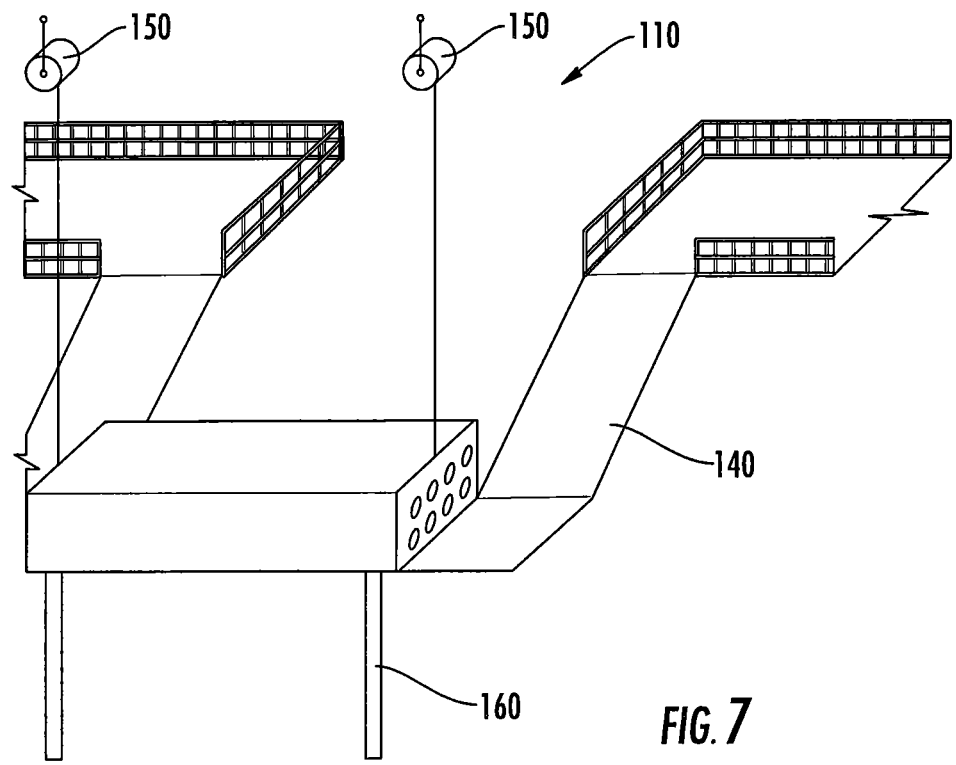
FIG. 7 is a schematic perspective view of a retractable datacommunications rack according to alternative embodiments of the invention.
Figure 8:
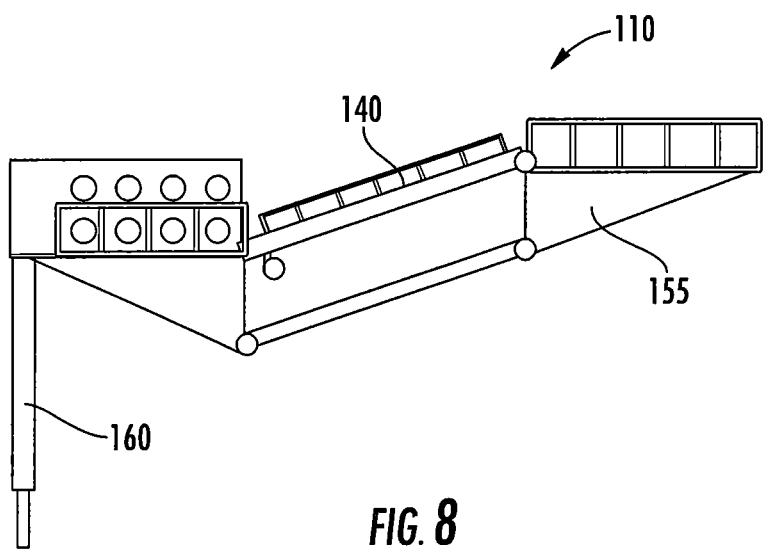
FIG. 8 is a schematic side view of the rack of FIG. 7.

Additional optional features and variations are shown in FIGS. 7 and 8, in which another embodiment of a rack, designated broadly at 110, is shown. In this embodiment, the rack 110 is mounted to the ceiling via a bracket 155 rather than to a vertical column. Also, the bridges 140 serve as the upper swing links. A lift assist unit 150 may be employed to assist in raising and lowering the enclosure 122. Exemplary actuation devices include a ceiling-mounted pulley and rope, pneumatic cylinders attached to the linkage, a screw and gear crank, counter weights or other types of devices designed to control the elevation and reduce injuries.

In the lowered position the enclosure may have folding legs 160 to provide stability and support during work operations. While in the lowered position, the folding legs 160 will be pulled down to provide stability to the enclosure. In some embodiments the legs unfold automatically as the rack 110 moves to the lowered position.

In the raised position a latching and locking device (not shown) may be integrated to prevent accidental lowering or movement. The latch mechanism may be designed to allow floor access and not require a ladder to activate.

Figure 9:
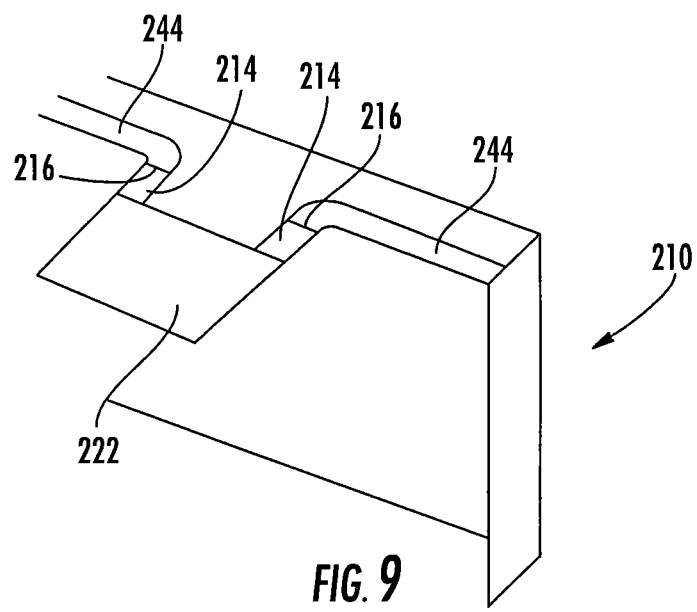
FIG. 9 is a perspective view of a retractable datacommunications rack according to further alternative embodiments of the invention, with the rack in a raised position.
Figure 10:
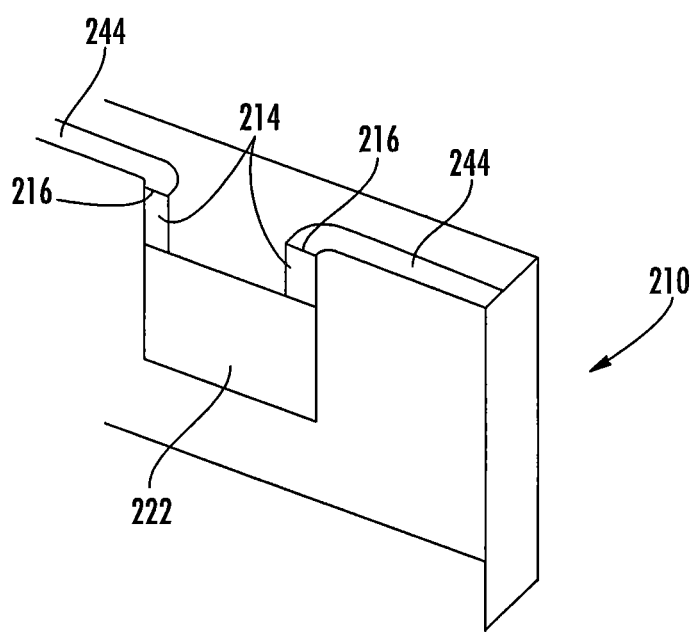
FIG. 10 is a side view of the rack of FIG. 9 shown in a lowered position.

Another rack, designated broadly at 210, is shown in FIGS. 9 and 10. The rack 210 is mounted to the ceiling via a bracket or other mounting means. Cables are routed through channels 244, then to the enclosure 222 via bridge members 214, which are fixed to the enclosure 222 and pivotally attached to the channels 244 or to the ceiling via hinges 216. The rack 210 can be moved between a raised position (FIG. 9) for storage and a lowered position (FIG. 10) for access to a technician.

Those skilled in this art will appreciate that the rack 210 may also be mounted to an adjacent wall or to a vertical column rather than being mounted to the ceiling.

The linkages shown herein comprise a plurality of pivotally interconnected links. Those skilled in this art will appreciate that the pivots between links can take a variety of configurations, such as pivot pins, rivets, bolt and nut combinations, and the like, any of which would be suitable for use with the present invention. Also, the shapes of the links may vary as desired, as may the locations of certain of the pivots. Moreover, in some instances combinations of pivot points may be replaced by equivalent structures, such as "slider-crank" configurations, like those described in B. Paul, *Kinematics and Dynamics of Planar Machinery* 4-21 (1979).

Also, it will be understood that the linkage that moves the enclosure between the raised and lowered positions may include a separate mounting member (such as the bracket 155 shown in FIG. 8) to which the linkage is attached, or may employ an existing structure (e.g., the structural column 12) as a mounting member. As used herein, the term "mounting member" is intended to encompass either scenario. Similarly, the term "mounting structure" is intended to mean a structure to which the mounting member is attached; thus, it may include a ceiling to which the bracket 155 is mounted, the floor on which the column 12 rests, a wall, or the like.

Also, although the racks 10, 110, 210 are discussed herein with respect to fiber optic cables, those skilled in this art will appreciate that the racks may be employed with other types of cables, including electrically conductive datacommunications cables such as twisted pair cable and coaxial cable, electrical power cable, hybrid fiber/power cables, and the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed is:

1. A retractable datacommunications rack, comprising:
   a mounting member configured to mount to a mounting structure;
   a linkage mounted to the mounting member;
   an enclosure mounted on the linkage and configured to provide locations for datacotmmunications interconnections;
   wherein the linkage is configured to move the enclosure between a retracted raised position and a lowered working position;
   an upward facing open channel extending in a parallel direction in relation to the enclosure;
   a first upward facing open bridge member pivotally mounted to the open channel and extending to a first side of the enclosure, the first upward facing open bridge member being pivotal relative to the enclosure; and
   a second upward facing open bridge member pivotally mounted to the open channel and extending to a second side of the enclosure, the second upward facing open bridge member being pivotal relative to the enclosure.

2. The datacommunications rack defined in claim 1, wherein the linkage is configured to maintain the enclosure in substantially horizontal orientation as it moves between the raised and lowered positions.

3. The datacommunications rack defined in claim 2, wherein the linkage includes an upper swing link pivotally mounted to the mounting member and to the enclosure and a lower swing link pivotally mounted to the mounting member and to the enclosure.

4. The datacommunications rack defined in claim 3, wherein the upper swing link and the lower swing link are substantially the same length.

5. The datacommunications rack defined in claim 1, wherein the enclosure further comprises a fiber management section.

6. The datacommunications rack defined in claim 5, wherein the enclosure further includes at least one of: a tool tray, a bulkhead adapter panel, and a drying desiccant section.

7. The datacommunications rack defined in claim 1, further comprising a lift assist unit that assists the enclosure in moving between the raised and lowered positions.

8. The datacommunications rack defined in claim 1, wherein the mounting member is configured to mount to a vertical column.

9. The datacommunications rack defined in claim 1, wherein the mounting member is configured to mount to a ceiling.

10. The datacommunications rack defined in claim 1, in combination with at least two fiber optic cables that are connected within one of the locations for datacommunications interconnection in the enclosure.

11. A retractable datacomnmunications assembly, comprising:
    a mounting member configured to mount to a mounting structure;
    a linkage mounted to the mounting member;
    an enclosure mounted on the linkage and configured to provide locations for datacommunications interconnections;
    wherein the linkage is configured to move the enclosure between a retracted raised position and a lowered working position;
    the assembly further comprising two fiber optic cables interconnected in one of the locations of datacommunications interconnections;
    an upward facing open channel extending in a parallel direction in relation to the enclosure;
    a first upward facing open bridge member pivotally mounted to the open channel and extending to a first side of the enclosure, the first upward facing open bridge member being pivotal relative to the enclosure; and
    a second upward facing open bridge member pivotally mounted to the open channel and extending to a second side of the enclosure, the second upward facing open bridge member being pivotal relative to the enclosure;
    wherein the fiber optic cables are routed to the enclosure along one or both of the first and second open bridge members, and wherein the first and second open bridge members are configured so that the fiber optic cables experience substantially no increase in tension in moving between the raised and lowered positions.

12. The assembly defined in claim 1, wherein the linkage is configured to maintain the enclosure in substantially horizontal orientation as it moves between the raised and lowered positions.

13. The assembly defined in claim 12, wherein the linkage includes an upper swing link pivotally mounted to the mounting member and to the enclosure and a lower swing link pivotally mounted to the mounting member and to the enclosure.

14. The assembly defined in claim 13, wherein the upper swing link and the lower swing link are substantially the same length.

15. The assembly defined in claim 13, wherein the upper swing link is a bridge member that receives the cables as they are routed to the enclosure.

16. The assembly defined in claim 11, wherein the mounting member is configured to mount to a vertical column.

17. The assembly defined in claim 11, wherein the mounting member is configured to mount to a ceiling.

18. A retractable datacommunications assembly, comprising:
    a mounting member configured to mount to a mounting structure;
    a linkage mounted to the mounting member; and
    an enclosure mounted on the linkage and configured to provide locations for datacommunications interconnections;

wherein the linkage is configured to move the enclosure between a retracted raised position and a lowered working position;

the assembly further comprising two fiber optic cables interconnected in one of the locations of datacommunications interconnections;

an upward facing open channel extending in a parallel direction in relation to the enclosure;

a first upward facing open bridge member pivotally mounted to the open channel and extending to a first side of the enclosure, the first upward facing open bridge member being pivotal relative to the enclosure; and a second upward facing open bridge member pivotally mounted to the open channel and extending to a second side of the enclosure the second upward facing open bridge member being pivotal relative to the enclosure;

wherein the enclosure further comprises a fiber management section that receives the fiber optic cables.

\* \* \* \* \*